May 13, 1941.  J. V. RYAN ET AL  2,241,926
HIGH PRESSURE HOSE COUPLING
Filed Nov. 10, 1938  2 Sheets-Sheet 1
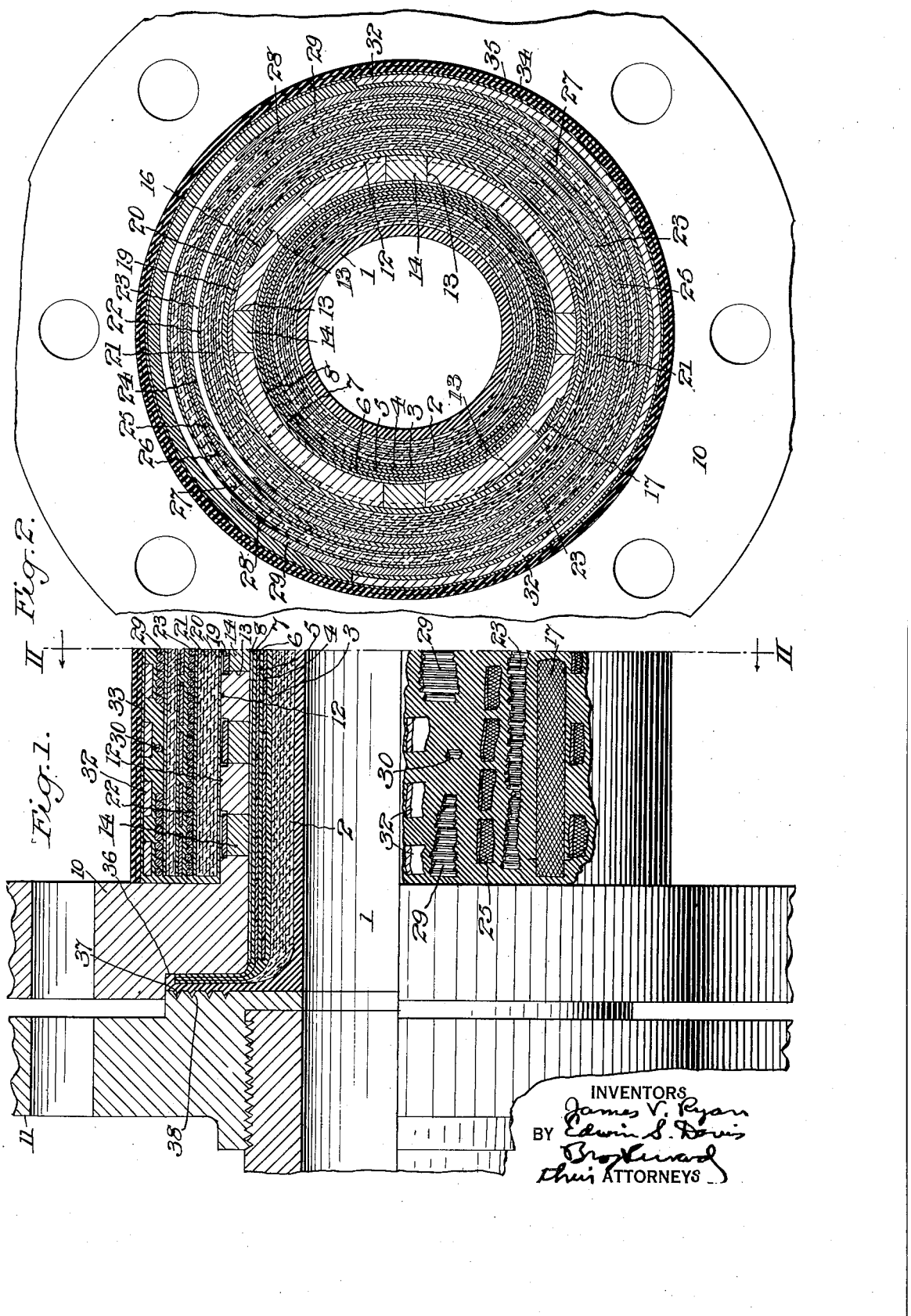

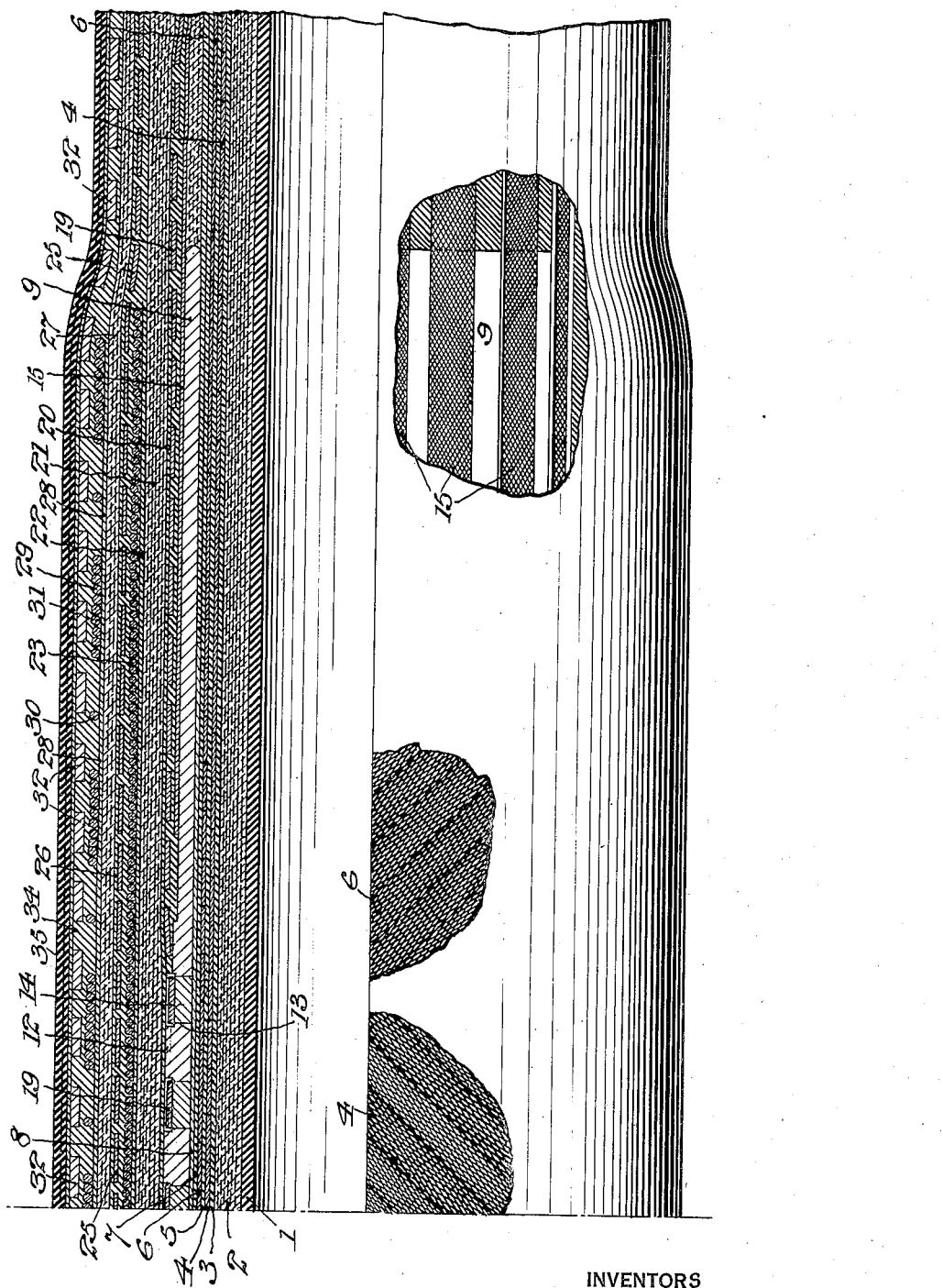

Patented May 13, 1941

2,241,926

UNITED STATES PATENT OFFICE 2,241,926

HIGH PRESSURE HOSE COUPLING

James V. Ryan, Beacon, N. Y., and Edwin S. Davis, Newtown, Conn., assignors to New York Rubber Corporation, New York, N. Y., a corporation of New York Application November 10, 1938, Serial No. 239,766

5 Claims. (Cl. 285—71)

This invention relates to high pressure hose and, more particularly, to that portion of the hose which is fitted to be coupled to apparatus in connection with which the hose is used.

An object of the invention is to provide a structure in which a rigid, and preferably metallic, coupling member is united with the flexible hose body elements so as to prevent leakage of the fluid carried by the hose at any point or in any direction adjacent said parts even though the hose be progressively flexed at different points along its length during the operation of the apparatus.

Another object consists in providing such a structure in which said coupling member is so formed as to lend itself to intimate association with the hose body elements and to resist even the slightest amount of longitudinal separation under the highest internal pressures.

Another object consists in providing such a structure in which the hose body elements adjacent to and cooperative with the said coupling member are so formed and arranged as to obviate any separation due either to radial or longitudinal stresses and slippage or distortion engendered thereby.

Another object consists in providing a yielding contact surface on said coupling member so formed as to adapt itself for mating engagement with a companion coupling element and provide a joint that will resist and defeat any tendency to fluid leakage intermediate said parts.

A further object consists in providing certain improvements in the form, construction, material and arrangement of the parts whereby the above named and other objects may effectively be attained.

A practical embodiment of the invention is represented in the accompanying drawings, in which Figs. 1 and 1a represent a detail side elevation, partly in radial section and partly broken away, of the hose and coupling members; and Fig. 2 represents a transverse section taken in the plane of the line II—II of Fig. 1, looking in the direction of the arrows.

The hose constituting the subject matter of this invention is primarily of the class that is fitted to withstand very high pressures and is commonly used in connection with the drilling of oil wells. As is well known, such wells are driven to very great depths, e. g. several thousand feet, and the drilling operation is accomplished by rotation of a drill. The high pressure hose is connected to the apparatus and is calculated to supply a suitable fluid, which frequently contains abrasive materials, down through a pipe to the point or bit of the drill for facilitating the drilling operation and for evacuating debris upwardly around the outside of the drill. In this operation the hose is coupled near the upper end of the drill and is progressively flexed at points along its length, and particularly near said coupling point, as the drill advances downwardly and as the apparatus to which the hose is coupled is raised from time to time for the addition of sections to the well pipe. Owing to the great depth to which the wells are dug, the hose is necessarily subjected to very great internal pressure and this frequently rises to an order of, say, thirty-five hundred pounds per square inch. Under these circumstances it will be evident that there is a great tendency to leakage and failure through whole or partial destruction adjacent the coupling point, which tendency our invention is calculated to overcome by improvement in coupling structure, in hose structure and in union between coupling and hose.

Turning now to the embodiment of the invention shown in the accompanying drawings, the hose has an inner lining designed for the conducting of the fluid, which lining is marked 1 and is preferably composed of suitable abrasive-resisting rubber compound which, with several variations, is well understood by the practical art so that it calls for no detailed description herein.

Immediately surrounding the lining is a plurality of layers of rubberized duck or canvas which are collectively marked 2. These layers are usually applied in bias cut strips so as to facilitate their conformation to the lining, and their composition, rubberizing treatment, and application are so much a part of the knowledge of this industry as to call for no further description herein. These duck or canvas layers obviously reinforce the lining 1 and they also serve the purpose of distributing internal pressure to outer reinforcing members while themselves absorbing shocks and strains.

Said fabric layers 2 are, in turn, covered with a layer of rubber compound 3 which is preferably somewhat thinner than the lining 1 and is calculated to serve the purpose of a cushion and a filling and bonding agent with respect to the previously described fabric elements and the next outer elements of the hose body. Suitable compounds for this layer 3 are likewise well known in the art.

The hose body is next provided with a strong reinforcing and constricting element in the form of a spiral winding 4 preferably composed of metallic mesh tape such as the braided or woven material that is commonly used in the margins or beads of automobile tire casings and is well known in the art as bead wire. This bead wire is applied under very substantial tension with a slight spacing between its adjacent coils in order to avoid undue friction or overlapping of the coils upon the inside of the body curve when the hose is flexed. The characteristics of this bead wire lend themselves readily to this application and the interstices therein permit the interflowing or movement of rubber from layer 3 so as to strengthen the union or interengagement of the parts.

Surrounding the winding of bead wire 4 is another layer of rubber compound 5 that is similar in form and function to the layer 3; and upon said layer 5 is placed another spiral winding 6 of bead wire or the like which in its form and function is like the winding 4 with the exception that winding 6 takes a spiral course opposite to that of winding 4 in order to balance the construction at these points and better to resist strains in both radial and longitudinal directions.

While we have noted a preference for bead wire as the material to constitute windings 4 and 6, it should be noted that other material could be substituted, although a tape form having interstices or irregularities or roughness for union with the rubber layers has substantial advantages.

Exterior to the winding 6 is located another rubber layer 7 which is, in form and function, similar to the layers 3 and 5; but it should be noted that the rubber layer 7 is compounded, in one of several ways well known to the art, so as to adapt it for a bonding attachment, under vulcanizing heat, to a metallic sleeve 8 which rests upon said rubber layer 7.

All the elements 1 to 7, hereinabove described, extend throughout the length of the hose, but the metallic sleeve 8 only extends a short distance, e. g., about one foot, from the end of the hose inwardly. The sleeve is preferably composed of metal such as brass, and it is slit longitudinally to facilitate its association with the inner layers of the hose body. The said brass sleeve 8 of course strengthens the body of the hose, but it is primarily intended to form a smooth and uniform outer surface for the inner hose elements in order to facilitate the operation of slipping in place the hose coupling element 9, that will be hereinafter referred to as a nipple.

The said nipple is preferably composed of metal, such as cast steel, and is of tapered tubular form with a bulky flange 10 at its outer end adapted for mating engagement with a companion or complementary coupling member indicated by 11.

The exterior of the nipple rearwardly of the flange 10 is fashioned in helical form so as to have what might be designated as an exterior screw thread with wide convolutions or threads, two of which are denoted by 12. By reference to Figs. 1 and 1a, it will be seen that there are six such convolutions, counting the adjacent portion of flange 10 and, intermediate said convolutions we have provided series of round holes that extend through the nipple 9 to the brass sleeve 8, two of said holes being marked 13. Examination of Figure 2 of the drawings will show that the said holes are arranged in staggered re- lationship instead of lying in straight lines longitudinally of the nipple. This staggered relationship, together with liberal spacing of the holes, obviates undue weakening of the nipple 9, and it also permits a more uniform and rigid interlocking engagement between the nipple 9 and sleeve 8, which engagement is preferably accomplished by filling the holes 13 with solder or the like that is of such compound, well known in the art, as firmly to adhere to the brass sleeve 8 and form plugs, two of which are marked 14, extending from the said sleeve into the nipple 9.

The construction just described establishes a very firm and strain resisting union between the nipple 9 and associated parts, and the shape and construction of the nipple is such as firmly to resist leakage or separation and to maintain a uniform conduit within the lining 1 for passage of the fluid.

The helical formation 12 on the nipple 9 may be made by machining or by welding or otherwise securing in place suitable convolutions, or by casting, or in any other practical manner; and the solder or the like constituting the plugs 14 is preferably of such low melting point as to be adequately fused and united with the brass sleeve 8 under ordinary vulcanizing temperatures. We have found that this form of nipple is so efficient as to eliminate the necessity of using external clamps for resisting separation between hose body and nipple.

To the exterior of the nipple 9, rearwardly of the helical formation 12, are attached a set of longitudinally disposed reinforcing elements 15. These elements are preferably composed of the metallic bead wire hereinabove described, and they may be secured to the nipple by soldering, brazing, or in any other suitable way. They extend rearwardly of the nipple into the hose body for varying distances, say a foot more or less, and, at a suitable distance to the rear of the nipple and to the rear of the brass sleeve 8, they are likewise attached to the coils of the bead wire winding 6 through the binding action of rubber layer 7 which may be supplemented by mechanical fastening as, for instance, soldering or brazing.

Two of the said reinforcing elements 15, which are particularly denoted by the reference numerals 16 and 17, and which are located at diametrically opposed points, extend forwardly along the nipple 9 through grooves formed in the helical parts 12 and are secured, as by soldering, to the flange 10.

The said elements 15, 16 and 17 have for an important purpose the reinforcing of the hose against injury from flexure at a point immediately rearward of the extremity of the nipple 9, and they also serve firmly to withstand strains exerted in such a direction as to tend to bring about relative longitudinal movement or separation between the nipple 9 and hose body. The extension of said elements 16 and 17 to the flange 10 and their fastening thereto, strongly reinforce the function just described. While we have specified the said elements as preferably consisting of metallic mesh bead wire, they may be composed of any other suitable material, although metal with interstices, or having roughnesses thereon, is highly desirable. Likewise it will be understood that, instead of extending only two of the elements, such as 16 and 17, through to the flange 10, we may extend three or more. It is, however, desirable that such extended elements be uniformly spaced in a circumferential direction in order properly to balance resistance to strain, and they may be covered with a thin layer of rubber.

The next reinforcing feature of the construction in a radially outward direction is a helical winding marked 19 and preferably composed of bead wire such as that used in the windings 4 and 6. It will be observed that this winding 19 follows a path similar to that of the helical formation 12 on nipple 9 and that the convolutions of the said winding are spaced apart so as to rest upon the solder plugs 14 and continue in lesser spaced relationship along the nipple 9 and from there on throughout the length of the hose. This helical winding of bead wire assists in tying the nipple into the hose body; in binding the longitudinal elements 15, 16 and 17 to the nipple; and in reinforcing the hose against rupture or injury from flexure adjacent the rear end of the nipple. It furthermore constitutes a strong constrictive reinforcing element of the hose body against the high pressures hereinabove mentioned.

Surrounding the wire winding 19 is another layer of rubber 20 which, in form and function, is substantially like layers 3 and 5; following which there is located a plurality of fabric plies, such as rubberized duck or canvas, which plies are collectively denoted by 21. These fabric plies serve for general reinforcing of the hose structure and specifically for separating the metallic layers within them from the metallic layers surrounding them, to be hereinafter described. The said plies 21 extend from the end of the hose rearwardly a substantial distance such, for instance, as from four or five to eight or nine feet, and each ply is preferably a little longer than the next one within it, such difference in length being, say, approximately one foot. This arrangement serves to step down or graduate the thickness of the layer of plies 21 as the main body of the hose away from its coupling end portion is reached.

Another layer of rubber 22, similar to layer 20, is placed on the outside of the fabric plies 21 for a purpose analogous to that hereinabove described in connection with the other rubber layers in the body; and this layer like layer 20 preferably extends throughout the length of the hose.

In order to provide a very strong constrictive or binding reinforcement for compressing the plies of fabric 21 and for tightening down the helical winding 19, we make use preferably of wire that is round in cross section and apply it with the coils in substantial engagement to form a continuous winding 23 extending from flange 10 back approximately to the rear end of nipple 9. Coppered steel spring wire of No. 12 gauge has been found to be highly satisfactory for this purpose. Its ends may be secured in any suitable manner and the layer or winding of wire thus formed is covered by another layer of rubber 24 that is similar to layer 22.

Around the last named rubber layer there is bound a spiral winding 25 of bead wire which is similar to those hereinbefore described and numbered 4, 6 and 19, except that this winding 25 has its convolutions spaced a little further apart than those of windings 4 and 6, and a little closer together than those of winding 19. This bead wire layer extends throughout the length of the hose and is for the purpose of resisting the expansive forces of internal pressure.

A rubber layer 26, similar to layer 24, surrounds the bead wire winding 25 and it, in turn, is covered with several plies of fabric 27, such as rubberized duck or canvas, that are similar to the plies 2 and 21. These plies constitute a reinforcing and cushioning element generally, and they specifically prevent chafing between the bead wire winding 25 and exterior wire windings to be hereinafter described. Such chafing might otherwise occur when the hose is flexed, particularly on the inner curve of the flexure, and would principally tend to injure the bead wire winding 25. On top of the said plies of fabric 27 is placed another rubber layer 28 which is similar to layer 26. The said two last named rubber layers and fabric plies extend throughout the length of the hose.

Another winding preferably consisting of coppered round steel spring wire, similar to that marked 23, is placed on top of the rubber layer 28 and is arranged in spaced groups of coils, the turns of each group being in substantial contact, and the groups being widely spaced with a single intermediate coil. The groups of this winding are denoted generally by 29 and the individual intermediate coils by 30. This wire winding serves to compress the plies of fabric 27 and acts as a means for still further securing the nipple 9 against movement in the hose body. The arrangement of spaced groups of wire coils just described serves to accomplish the said functions while accommodating the layer or winding to the necessary flexing of the hose and avoiding undue rigidity which might result from a multiplicity of wire windings having all their coils in substantial contact.

Another rubber layer 31, similar to layer 28, serves to fill in the spaces between the coils of the wire layer 29, 30, and also to cover the said wire.

A final reinforcement is spirally wound around the last named rubber layer 31 and preferably consists of flat rectangular steel wire 32 arranged in spaced coils with intermediate filling and covering of rubber 33 similar to the rubber layers hereinbefore described. This winding of wire 32 is a very powerful external reinforcing member to resist expansion from internal pressure, and it also specifically acts as a protector for the under parts of the hose body against deep gouging from exterior accidental contacts. This wire winding 32 extends throughout the length of the hose and, if desired, round wire such as that composing layers 23 and 29, could be substituted for the wire of flat rectangular section.

Outside the rubber layer 33 which covers the wire winding 32, there is placed a single ply 34 of fabric such as rubberized open mesh duck or canvas cut on the bias. This material readily adapts itself to curve contour and intimate engagement with rubber, and it serves mainly to assist in holding the final exterior rubber covering 35 against pulling or tearing away from the body of the hose. The rubber layer 35 is preferably compounded so as to resist frictional wear or abrasion and the fabric strip 34 greatly increases the strength of the union between the said exterior rubber layer and the next inner rubber layer 33 which is not so heavily compounded as it is not required to resist abrasion from frictional contact.

The coupling member 10 is cut away on its face as indicated at 36 to form a circular recess and the forward extremity of rubber liner 1, together with one or more ends of fabric plies 2 and rubber layers 3 and 5, are folded or bent back so as to lie snugly in said recess 36, thus forming a yielding facing or gasket-like packing for the face of flange 10 that is fitted to engage its companion coupling member 11. The said face of liner 1 is provided with a series (in the present instance 4) of concentric beads or ridges 37, that are triangular in cross section and fitted to enter corresponding recesses 38 formed in the abutting face of the coupling member 11. It will be clear that when said coupling members 10 and 11 are brought into face contact and firmly clamped together, as by bolts or the like passing through the holes shown therein, the said extension of rubber and fabric lying in the recess 36, and more specifically the beads 37, will set up an extremely leak-proof engagement between the coupling members so as to resist any escape of fluid at that point in spite of very heavy internal fluid pressure and the constant strain at the coupling arising from the flexing of the hose hereinabove described.

It should be said that all the rubber elements and the rubberizing on the fabric elements are compounded for vulcanization purposes, and that the compounds are adjusted as, for instance, with respect to sulphur and accelerator content, so as to reach the desired or optimum state of vulcanization in the course of subjection to a given degree of heat for a given period of time. This is all within the skill of the calling and requires no more specification than mere reference by way of direction. Such vulcanization may conveniently be accomplished by subjecting the assembled parts to steam heat, and, as the vulcanizing heat, of course, softens the rubber so as to bring it almost to a fluid condition, the rubber will move or flow or migrate into all openings, even of extremely minute dimensions, and thereby bring about a very firm bonding and, in effect, a unitary structure of the hose elements and coupling part, consisting of flange and nipple, that is associated therewith. Where the rubber portions are to contact with metallic portions, they are compounded so as to bring about union therewith through vulcanization, and the same applies where the rubber parts are contiguous to fabric parts or to other rubber parts of differing characteristics. Furthermore, the solder or the like that fills in the holes 13 with plugs 14 for the purpose of uniting the nipple 9 and brass sleeve 8 is, as previously indicated, of such low melting or fusing point that it will flow and perform its function during the time and temperature of vulcanization allotted for uniting the elements of the hose by vulcanization as just described.

We believe that the structure hereinabove described contains a number of novel elements; that it is novel as a whole; and that it effects a union of hose and coupling member, a strength of hose, and a tightness of joint between companion coupling members, heretofore unattained.

We desire it to be understood that various changes may be resorted to in the form, construction, material, and arrangement of the parts, as well as in the steps followed in constructing the hose, without departing from the spirit and scope of our invention, and hence we do not intend to be limited to the details herein shown and described except as they may be included in the claims.

What we claim is:

1. In a hose, a coupling member provided with a nipple embedded in the body of the hose, said nipple having an exterior helical formation thereon adjacent its outer end and being provided with perforations therethrough located intermediate the spirals of said helical formation, a substantially smooth metallic sleeve embedded in the hose body adjacent the inside of said nipple and secured thereto by binding material located in said perforations, and a reinforcing winding located intermediate the spirals of said helical formation in contact with said binding material and extending rearwardly from said nipple into the body of the hose.

2. In a hose, a coupling member provided with a nipple embedded in the body of the hose, said nipple having an exterior helical formation thereon adjacent its outer end with perforations therethrough located intermediate the spirals of said helical formation and having a substantially smooth exterior from said helical formation to its inner end, a substantially smooth metallic sleeve embedded in the hose body adjacent the inside of said nipple and secured thereto by binding material located in said perforations, and a reinforcing winding located intermediate the spirals of said helical formation in contact with said binding material and extending rearwardly along its substantially smooth exterior and into the body of the hose.

3. In a hose, a coupling member provided with a nipple embedded in the body of the hose, said nipple having an exterior helical formation thereon adjacent its outer end and being provided with perforations therethrough located intermediate the spirals of said helical formation, a substantially smooth metallic sleeve embedded in the hose body adjacent the inside of said nipple and secured thereto by binding material located in said perforations, a reinforcing winding located intermediate the spirals of said helical formation in contact with said binding material and extending rearwardly from said nipple into the body of the hose, and longitudinally disposed reinforcing members secured to said nipple near its outer end and extending rearwardly under said reinforcing winding and along the exterior of the nipple to a point in the body of the hose substantially beyond the inner end of the nipple.

4. In a hose, a coupling member provided with a nipple embedded in the body of the hose, said nipple having an exterior helical formation thereon adjacent its outer end and being provided with perforations therethrough located intermediate the spirals of said helical formation, a substantially smooth metallic sleeve embedded in the hose body adjacent the inside of said nipple and secured thereto by binding material located in said perforations, a reinforcing winding located intermediate the spirals of said helical formation in contact with said binding material and extending rearwardly from said nipple into the body of the hose, and longitudinally disposed reinforcing members secured to said nipple near its outer end and extending rearwardly under said reinforcing winding and along the exterior of the nipple to a point in the body of the hose substantially beyond the inner end of the nipple, the body of the hose including plies of fabric surrounded by reinforcing windings located within the nipple, and plies of fabric surrounded by reinforcing windings located without the nipple, part of said outer reinforcing windings extending throughout the length of the hose and part extending no further than substantially to the inner end of the nipple.

5. In a hose, a coupling member provided with a nipple embedded in the body of the hose, said nipple having an exterior helical formation thereon adjacent its outer end and being provided with perforations therethrough located intermediate the spirals of said helical formation, a substantially smooth metallic sleeve embedded in the hose body adjacent the inside of said nipple and secured thereto by binding material located in said perforations, a reinforcing winding located intermediate the spirals of said helical formation in contact with said binding material and extending rearwardly from said nipple into the body of the hose, and longitudinally disposed reinforcing members secured to said nipple near its outer end and extending rearwardly under said reinforcing winding and along the exterior of the nipple to a point in the body of the hose substantially beyond the inner end of the nipple, the body of the hose including plies of fabric surrounded by reinforcing windings located within the nipple, and plies of fabric surrounded by reinforcing windings located without the nipple, part of said outer reinforcing windings extending throughout the length of the hose and part extending no further than substantially to the inner end of the nipple, at least one of said outer reinforcing windings consisting of spaced groups of closely arranged coils.

JAMES V. RYAN.
EDWIN S. DAVIS.